United States Patent Office 3,521,485
Patented July 21, 1970

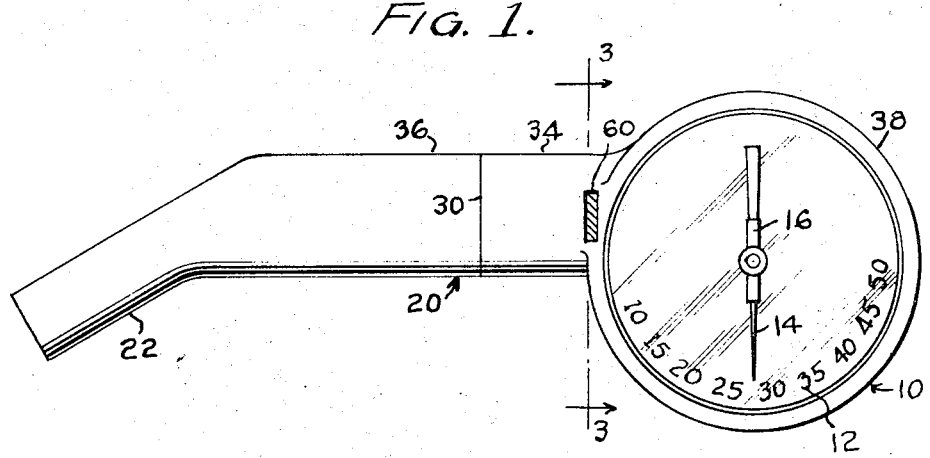
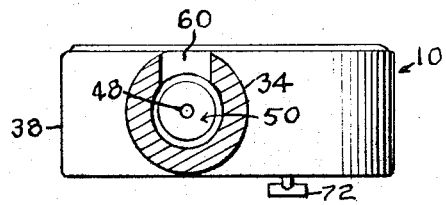
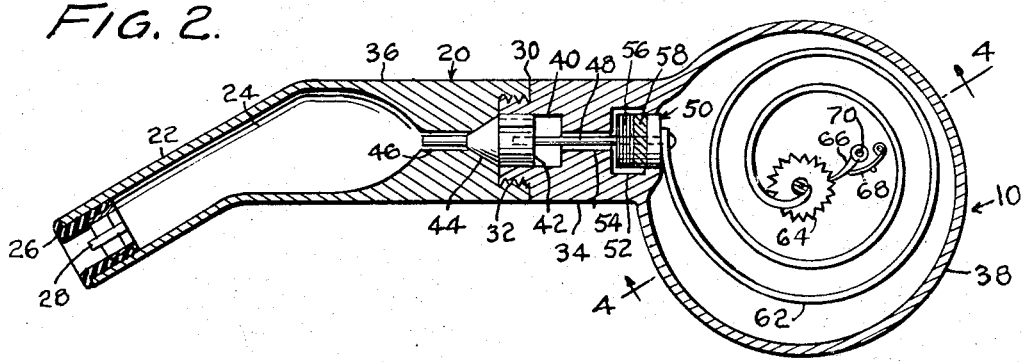
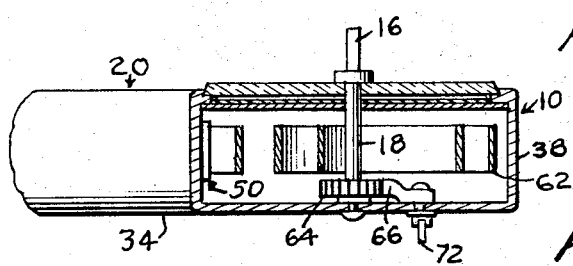
INVENTOR
Francis A. Porter
BY Alexander B Blair
ATTORNEY

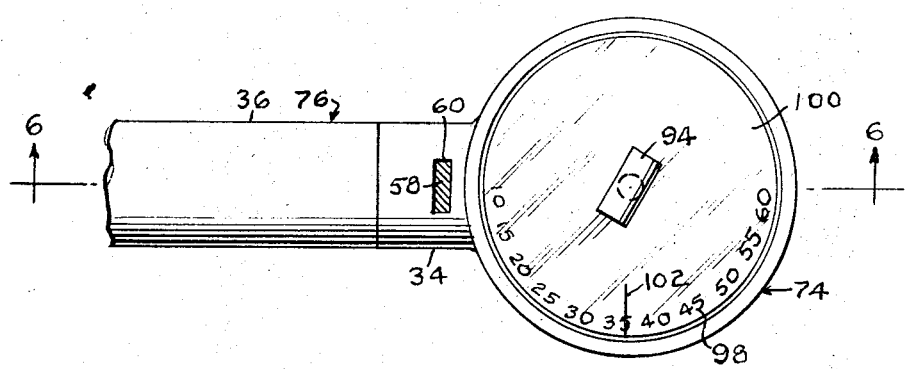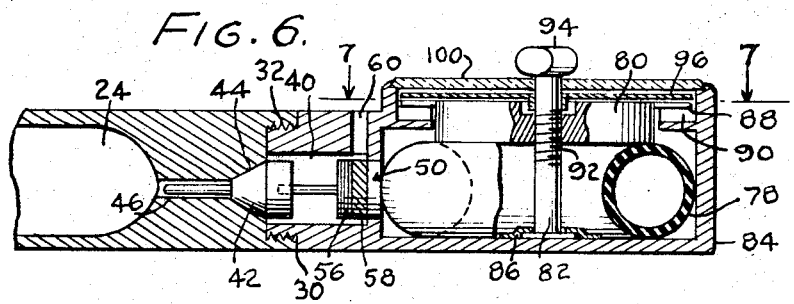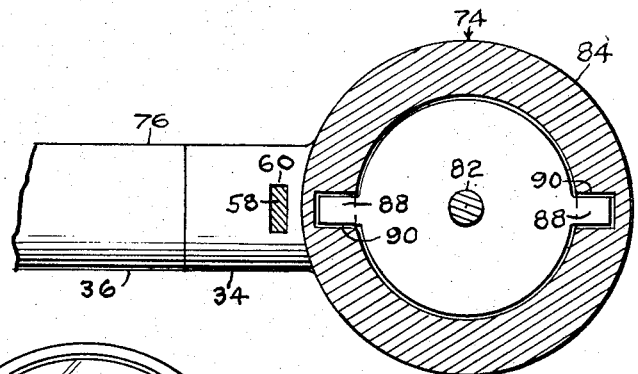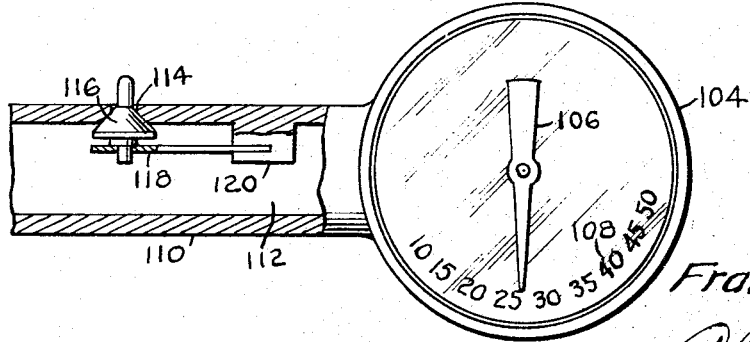

3,521,485
AIR PRESSURE GAUGE WITH PRESSURE RELEASE MEANS
Francis A. Porter, Sacramento, Calif.
(Box 20, Big Arm, Mont. 59910)
Filed July 23, 1968, Ser. No. 746,982
Int. Cl. B60c 23/02
U.S. Cl. 73—146.3
4 Claims

ABSTRACT OF THE DISCLOSURE

A pressure gauge having a neck portion with a nozzle on one end and a slidable release valve on the other end and having an indicator portion which is manually set to exert pressure upon the release valve mechanism.

BACKGROUND OF THE INVENTION

It is the common practice to inflate a motor vehicle tire to an approximate pressure, and then check with a pressure gauge to determine the accuracy of the pressure. If the tire has been under-inflated, it is necessary to admit more air into the tire. When over-inflation occurs, it is necessary to depress the valve stem of the tire to release excess pressure, and again check the pressure with an accurate tire gauge. Sometimes it is necessary to release pressure from the tire several times before the proper degree of inflation is reached.

SUMMARY OF THE INVENTION

The device comprises a tire gauge capable of being set for a predetermined inflation of a tire or other air pressure receiving receptacle. A projecting neck, associated with the tire gauge, has a free end engageable over the threads of a tire valve and is provided with means for releasing excess pressure from the tire. In inflating the tire, therefore, it is preferable that the tire be over-inflated. Then, upon applying the pressure device to a tire valve, the excess pressure may be relieved until the tire pressure corresponds to that to which the gauge has been set.

In one form of the invention, a manually operable valve is provided and when the tire is over-inflated, this valve may be operated to relieve pressure from the tire until the pressure drops to a point indicated by the tire gauge. In other forms of the invention, the valve past which excess pressure is relieved is biased to closed position by means associated with the gauge, the biasing force being such that the valve will be opened to relieve tire pressure when the tire has been over-inflated. The pressure release valve will automatically close when the tire pressure drops to the point indicated by the pressure-setting of the gauge.

BRIEF DESCRIPTION OF THE DRAWING

FIG. 1 is a plan view of one form of the invention;
FIG. 2 is a horizontal sectional view looking in the same direction as FIG. 1;
FIG. 3 is a detail section on line 3—3 of FIG. 1;
FIG. 4 is a section on line 4—4 of FIG. 2;
FIG. 5 is a plan view of a modified form of the device, a portion being broken away;
FIG. 6 is a fragmentary sectional view on line 6—6 of FIG. 5;
FIG. 7 is a section on line 7—7 of FIG. 6; and
FIG. 8 is a plan view, partially in section, showing a manually operable form of the invention.

DESCRIPTION OF THE PREFERRED EMBODIMENTS

Referring to FIG. 1, the numeral 10 designates a tire gauge having a numbered dial 12 to indicate desired tire inflation pressures and over which operates a pointer 14 adapted to be turned by a handle 16 connected to the shaft 18 (FIG. 4) of the pointer.

Projecting from the tire gauge is an elongated neck 20 having a straight section which may be used as a handle and an angular reduced end 22 provided with a passage 24 therethrough (FIG. 2). The extremity of the reduced end 22 is provided with a fitting including a rubber seal 26 adapted to extend over the threaded end of a tire valve and having therein a pilot projection 28 adapted to unseat the valve when the device is attached to the tire valve.

The projecting neck 20 may be split as at 30 and provided with threaded connection 32 between neck portions 34 and 36, the former of which is preferably integral with the substantially cylindrical casing 38 of the tire gauge 10.

Within the neck portion 34 is a cylindrical recess 40 in which is arranged a valve 42 engageable with a seat 44 in the neck portion 36. This valve seat communicates through a passage 46 with the passage 24.

The valve 42 is provided with a stem 48 engaging a cylindrical slide indicated as a whole by the numeral 50. This member is arranged to slide in a cylinder 52 communicating with the cylinder 40 through a passage 54 surrounding the valve stem 48. The member 50 is provided with two portions 56 and 58 colored to provide a visual indication through an opening 60 (FIGS. 1 and 2) for a reason which will be described. The inner portion 56 of the member 50 is preferably red (or white) while the portion 58 is preferably green (or black). As illustrated, the portions 56 and 58 are respectively colored red and green.

Within the casing 38 of the tire gauge is arranged a spring 62 having its inner end connected to the shaft 18 and its outer end connected to the member 50. The shaft 18 is provided with a ratchet wheel 64 (FIGS. 2 and 4) engageable by a pawl 66 engaged by a leaf spring 68 to tend to maintain it in engagement with the teeth of the ratchet wheel 64. The pawl 66 is fixed to a shaft 70 projecting through the casing 38 (FIG. 4) and provided with a handle 72 manually movable to release the pawl 66 from the ratchet wheel 64.

In FIGS. 5, 6 and 7 a modified form of the invention is shown wherein a pressure gauge 74 is provided with a projecting neck 76 similar to the neck 20 previously described. This neck is provided with the same elements as shown in FIG. 2 and such elements have been indicated with the same reference numerals. Instead of the metal spring in FIG. 2, a hollow annular member 78 is employed which may be in the form of a torous, or may be elongated with an opening therethrough axially thereof. The member 78 is formed of elastic material, for example, rubber, and has one portion of its periphery engaging the member 50 as shown in FIG. 6. The degree to which the member 78 is inflated will determine the pressure exerted against the member 50 and hence the pressure tending to close the valve 42.

An axial follower 80 is arranged above the member 78 and has threaded therethrough a screw 82, the lower end of which may be rotatably connected to the bottom of the gauge housing 84, for example, by a socket 86. This follower is provided preferably at diametrically opposite points with projections 88 slideable in guides 90 formed in the top portion of the casing 84. This arrangement prevents rotation of the follower 80. The threads 92 of the screw 82 move the follower 80 upwardly or downwardly upon rotation of the screw, the upper end of which is provided with a non-circular finger piece 94 for rotating the screw 82.

Fixed to the screw 82 above the follower 80 is a dial 96 calibrated as at 98, and above this dial is arranged a glass 100, fixed to the casing 84 and having an indicating pointer 102 preferably etched in the glass 100.

The forms of the invention previously described are automatic in operation, while the form shown in FIG. 8 is manually operable. In this case a non-locking gauge 104 is provided with a pointer 106 operable over dial calibrations 108. The gauge 104 is provided with a projecting neck 110 having a valve engaging setting at its end, not shown, similar to that shown in FIG. 2. Tire pressures are communicated to the gauge 104 through a passage 112 in the neck 110. This neck is provided with a pressure release opening 114 controlled by a valve 116 biased to closed position by a leaf spring 118 anchored to a block 120.

OPERATION

In the form of the invention shown in FIGS 1 to 4, inclusive, a vehicle tire (or other air pressure receiving receptacle) is connected to a source of pressure, for example, an air hose, at a vehicle filling station. The tire is preferably over-inflated. The pointer 14, being set for the desired tire pressure, for example, about 28 pounds in FIG. 1, the device is then attached to the valve of the tire, the fitting including the rubber seal 26 and pilot stem 28 sealing the tire valve against leakage and opening the valve inside to admit air pressure to passage 24. The pressure of the spring 62 opposes opening movement of the valve 42. However, if the tire pressure exceeds the dial setting of the tire gauge, the tire pressure will force the valve 42 to open position, admitting air past the valve 42 and through passage 54 into the chamber 52 from which air escapes through opening 60. When the pressure in the tire decreases to the pressure at the dial setting of the gauge 10, the valve 42 will close. The operator will be apprised of the fact that no more air is escaping from the tire since the hissing sound of escaping air will stop.

When the valve 42 is closed, the green portion 58 of the member 50 will be visible through the opening 60. When the device is attached to an over-inflated tire, the pressure opens the valve 42 and the red portion 56 of the member 50 will be visible through the opening 60. As soon as the pressure is reduced to the setting of the pointer 14 of the dial 10, the valve 42 will close and the green portion 58 of the member 50 will appear in the opening 60. If, after inflating the tire and detaching the pressure gauge, the green portion 58 appears in the opening 60, the operator will know immediately that the tire has not been over-inflated and will re-apply the nozzle of the air hose to the tire valve.

The pawl 66 may be released from the ratchet wheel 64 by turning the handle 72 (FIG. 4) for the resetting of the gauge 10.

The device shown in FIGS. 5, 6 and 7 operates in exactly the same manner as the device in FIGS. 1 to 4, inclusive, except for the means biasing the valve 42 to closed position. In this case the pressure within the torous 78 or other inflatable device will determine the pressure opposing opening movement of the valve 42 in accordance with the desired inflation pressure for the tire. This internal pressure in the torous 78 is determined by vertical movement of the follower 80, which is controlled by rotation of the screw 82. The rotation of this screw rotates the dial 96 to bring the desired indication of tire pressure into registration with the pointer line 102. By turnng the finger piece 94 clockwise in FIG. 5, the desired pressure indication will be increased, and the follower 80 will move downwardly to increase pressure in the torous 78, thus increasing the pressure of this element against the member 50. Thus, as in the previously described form of the invention, the valve 42 will open when the tire is over-inflated and will close when the tire pressure has decreased to the setting of the gauge 74.

The form of the device in FIG. 8 is non-automatic. The gauge 104 is a conventional pressure gauge. Here again, the tire is preferably over-inflated and such over-inflation will be indicated on the gauge 104 when the device is attached to a tire. For example, assuming that a tire pressure of 28 pounds is desired and the tire is over-inflated to 35 pounds, the operator, while holding the device in engagement with the tire stem will open the valve 116 and air will escape from the tire. The finger 106 will move clockwise over the dial of the gauge and when the desired pressure of 28 pounds is reached, the operator will release the valve 116.

The present device, therefore, facilitates the proper inflation of tires without repeatedly attaching and removing an air hose or pressing the valve stem to release air therefrom. It usually requires only two operations to provide the desired tire pressure, namely, the over-inflation of a tire from a tire hose and the attachment of the present device to release excess tire pressure down to the desired point.

From the foregoing it will now be seen that there is herein provided an improved air pressure gauge with pressure release means which accomplishes all of the object of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. A pressure gauge device for a pressure receiving container having a valve through which air pressure is introduced, comprising a pressure gauge, means carried by said pressure gauge and including a nozzle connectable to the valve of the container to admit air pressure therefrom to said gauge, a release valve between said nozzle and said gauge to release pressure from the container when said pressure is higher than the desired container pressure indicated by said gauge, a projecting neck connected at opposite ends of said gauge and to said nozzle, said release valve being arranged in said neck, said gauge being provided with resilient means adjustable therewith to oppose opening movement of said release valve according to the desired pressure in the container, said resilient means comprising a hollow elastic member having a portion arranged to transmit a closing force to said release valve, and adjustable means acting against said hollow resilient member to vary the pressure therein and thus vary the pressure tending to close said release valve in accordance with the desired pressure to be retained in the container.

2. A device according to claim 1 wherein said pressure gauge comprises a casing in which said hollow resilient member is arranged, a follower in said casing engaging said hollow resilient member, a stem threaded through said follower and rotatable to vary the pressure of said follower against said hollow resilient member and thus vary the force of the latter tending to maintain said valve closed according to the desired pressure to be retained in the container, a pressure pointer carried by said gauge, and a gauge disk carried by said threaded stem and rotatable therewith with relation with said pointer to indicate the pressure in said hollow resilient member tending to close said release valve when pressure in the container drops to the indicated pressure on said gauge disk.

3. A pressure gauge device for a pressure receiving container having a valve through which air pressure is introduced, comprising a pressure gauge, means carried by said pressure gauge and including a nozzle connectable to the valve of the container to admit air pressure therefrom to said gauge, a release valve between said nozzle and said gauge to release pressure from the container when said pressure is higher than the desired container pressure indicated by said gauge, a projecting neck connected at opposite ends to said gauge and to said nozzle, said release valve being arranged in said neck, said gauge being provided with resilient means adjustable therewith to oppose opening movement of said release valve according to the desired pressure in the container, said neck being provided with a chamber to which pressure is released when said release valve is open, a slidable member arranged in said chamber and connected to said release valve and engaged by said resilient means, said neck being provided with a pressure release opening communicating between said chamber and the atmosphere, and said slidable member being provided with longitudinally adjacent differently colored portions one of which is visible through said pressure release opening when said pressure release valve is closed, and the other of which is visible when said pressure release valve is open.

4. A pressure gauge device for a pressure receiving container having a valve through which air pressure is introduced, comprising a pressure gauge, means carried by said pressure gauge and including a nozzle connectable to the valve of the container to admit air pressure therefrom to said gauge, a release valve between said nozzle and said gauge to release pressure from the container when said pressure is higher than the desired container pressure indicated by said gauge, a projecting neck connected at opposite ends to said gauge and to said nozzle, said release valve being arranged in said neck, said gauge being provided with resilient means adjustable therewith to oppose opening movement of said release valve according to the desired pressure in the container, said resilient means comprising a spring having an inner portion connected to a manually controlled ratchet wheel and an outer portion connected to said release valve, said inner and outer portions lying in the same plane, and said inner portion exerting a force transmitted by said outer portion to said release valve, the force varying with the turning of said ratchet wheel thereby varying the pressure tending to close said release valve in accordance with the desired pressure to be contained in the container.

References Cited

UNITED STATES PATENTS

| | | | |
|---|---|---|---|
| 1,265,693 | 5/1918 | Manning | 73—146.8 X |
| 1,489,164 | 4/1924 | Smith | 73—146.8 X |
| 3,176,706 | 4/1965 | Scramlin | 73—146.3 X |
| 3,260,233 | 7/1966 | Bergunder | 116—34 |

LOUIS R. PRINCE, Primary Examiner

J. W. ROSKOS, Assistant Examiner

U.S. Cl. X.R.

116—34